United States Patent
Ohba et al.

(10) Patent No.: US 7,974,800 B2
(45) Date of Patent: Jul. 5, 2011

(54) METHOD, APPARATUS, AND PROGRAM FOR DETECTING THE CORRELATION BETWEEN REPEATING EVENTS

(75) Inventors: Nobuyuki Ohba, Sendai (JP); Yoshitami Sakaguchi, Hadano (JP); Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 11/937,761

(22) Filed: Nov. 9, 2007

(65) Prior Publication Data

US 2008/0137800 A1 Jun. 12, 2008

(30) Foreign Application Priority Data

Dec. 12, 2006 (JP) ................. 2006-334864

(51) Int. Cl.
*G06F 17/00* (2006.01)
*G06F 17/40* (2006.01)
(52) U.S. Cl. ........... 702/78; 702/127; 702/187; 708/422
(58) Field of Classification Search ................ 702/78, 702/127, 186, 187
See application file for complete search history.

(56) References Cited

U.S. PATENT DOCUMENTS

| | | | | |
|---|---|---|---|---|
| 4,580,056 A | * | 4/1986 | Kaiser et al. | 250/390.01 |
| 4,914,444 A | * | 4/1990 | Pifer et al. | 342/460 |
| 6,006,016 A | * | 12/1999 | Faigon et al. | 714/48 |
| 6,067,643 A | * | 5/2000 | Omtzigt | 714/47 |
| 6,098,178 A | * | 8/2000 | Moretti et al. | 713/500 |
| 6,105,087 A | * | 8/2000 | Rivoir | 710/100 |
| 2002/0107841 A1 | | 8/2002 | Hellerstein et al. | |
| 2006/0164997 A1 | | 7/2006 | Graepel et al. | |

FOREIGN PATENT DOCUMENTS

| | | |
|---|---|---|
| JP | 09-212385 | 8/1997 |
| JP | 2001067248 | 3/2001 |
| JP | 2005190270 | 7/2005 |
| JP | 2006-004346 | 1/2006 |

OTHER PUBLICATIONS

K. Takemori et al, Modeling Techniques about Statistical Theory of Attack Events Technical Report of IEICE, NS2003-286, pp. 171-174, Mar. 2004.

* cited by examiner

*Primary Examiner* — Hal D Wachsman
(74) *Attorney, Agent, or Firm* — Dillon & Yudell LLP

(57) ABSTRACT

A detecting apparatus detects the degree of correlation between first events and second events repeatedly occurring in an observed apparatus includes an acquiring unit that acquires second event count values each indicating the number of second events occurring during each first period between each first event and the first event next thereto. A measuring unit measures an observed number of each second event count value derived from the number of times the second event count value is observed. A calculating unit calculates the degree of correlation between the first events and the second events based on the observed number of each second event count value.

17 Claims, 12 Drawing Sheets

[Figure 1]
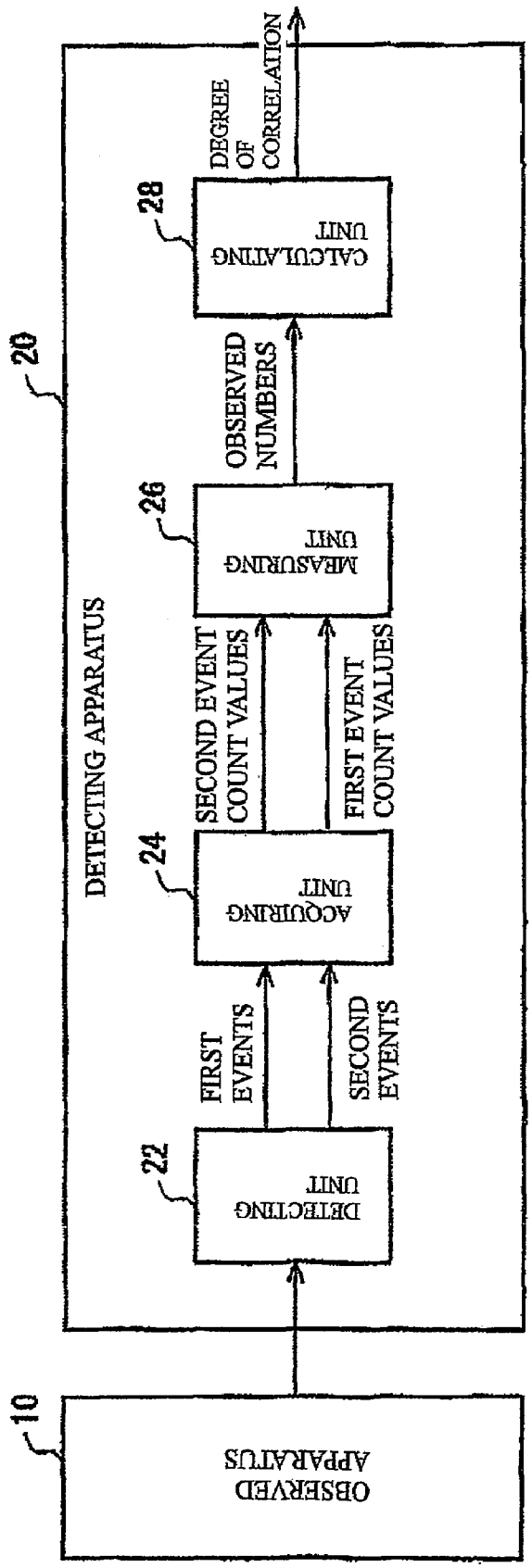

[Figure 2]
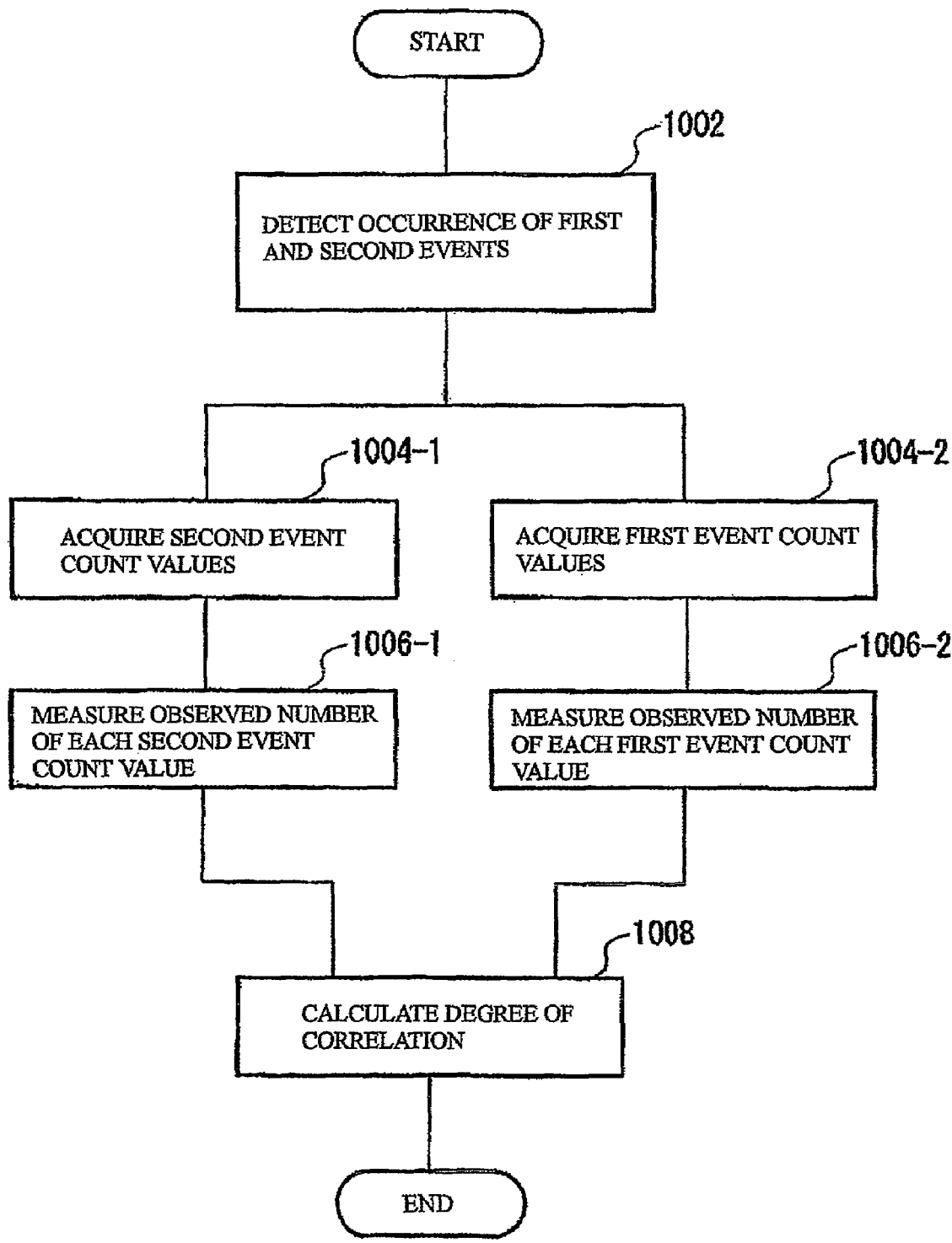

[Figure 3]
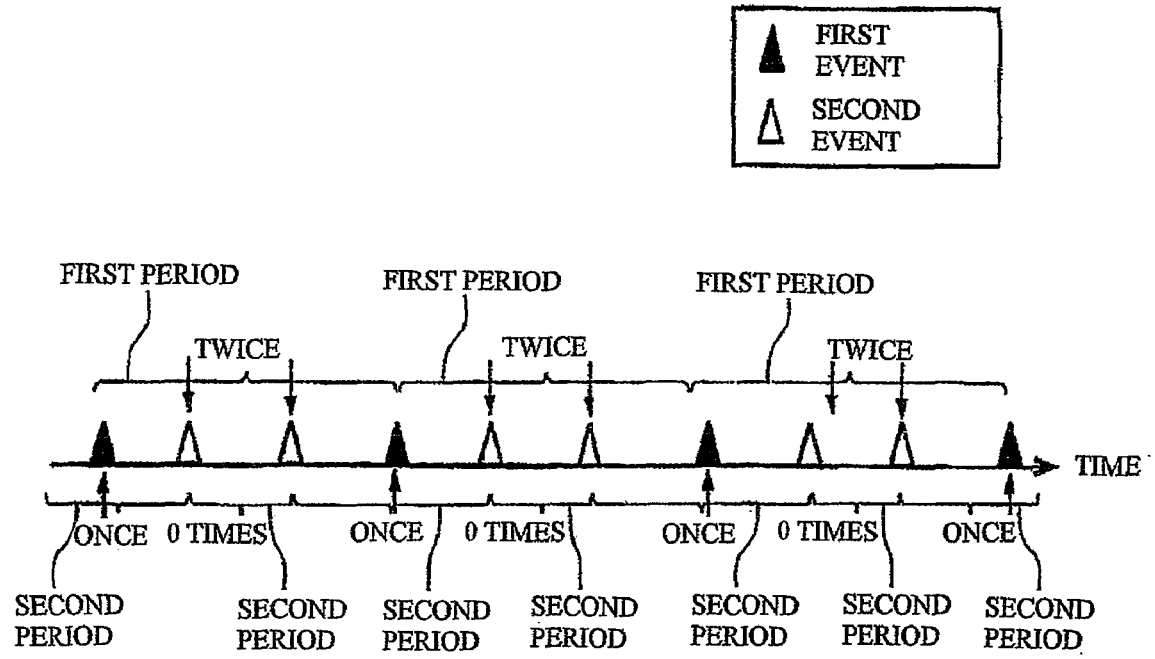
[Figure 4]
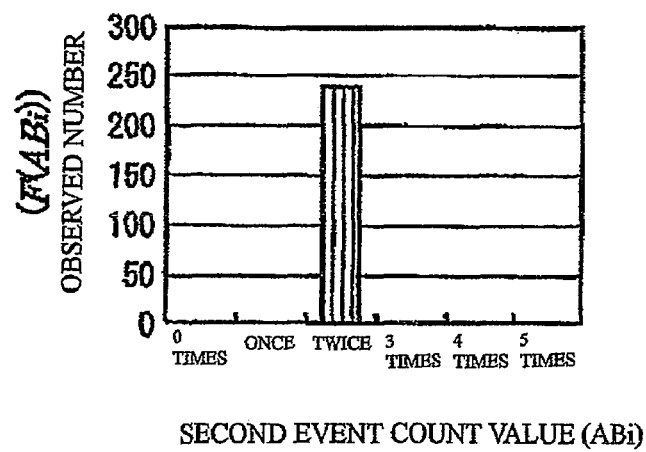

[Figure 5]
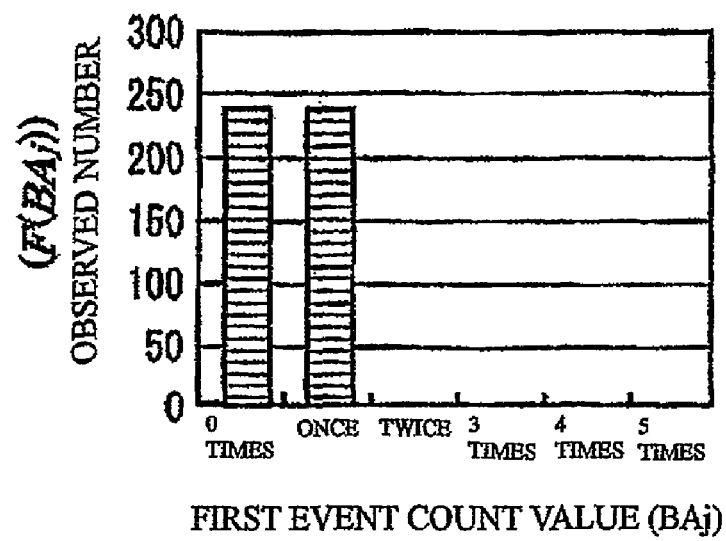
FIRST EVENT COUNT VALUE (BAj)
[Figure 6]
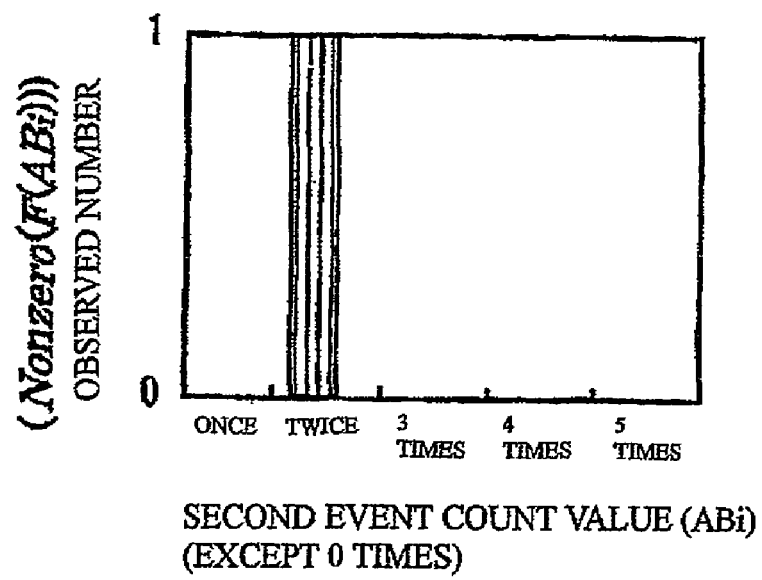
SECOND EVENT COUNT VALUE (ABi)
(EXCEPT 0 TIMES)

[Figure 7]
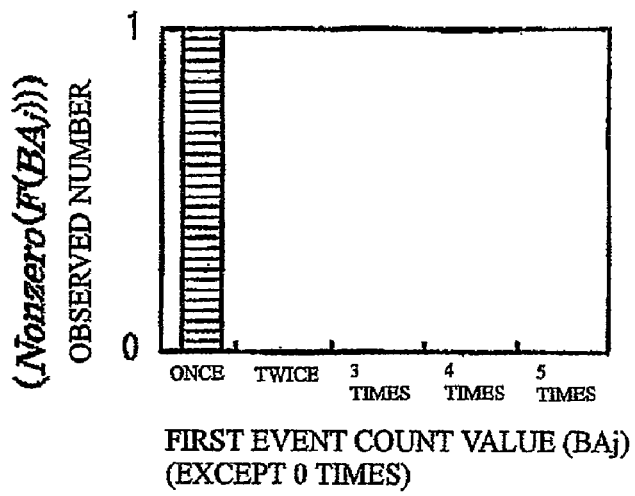
FIRST EVENT COUNT VALUE (BAj)
(EXCEPT 0 TIMES)
[Figure 8]
| | FIRST EVENT COUNT VALUE | ONCE | TWICE | 3 TIMES | 4 TIMES | 5 TIMES |
|---|---|---|---|---|---|---|
| SECOND EVENT COUNT VALUE — Nonzero(F(BAj)) / Nonzero(F(ABi)) | | 1 | 0 | 0 | 0 | 0 |
| ONCE | 0 | 0 | 0 | 0 | 0 | 0 |
| TWICE | 1 | 1 | 0 | 0 | 0 | 0 |
| 3 TIMES | 0 | 0 | 0 | 0 | 0 | 0 |
| 4 TIMES | 0 | 0 | 0 | 0 | 0 | 0 |
| 5 TIMES | 0 | 0 | 0 | 0 | 0 | 0 |

[Figure 9]
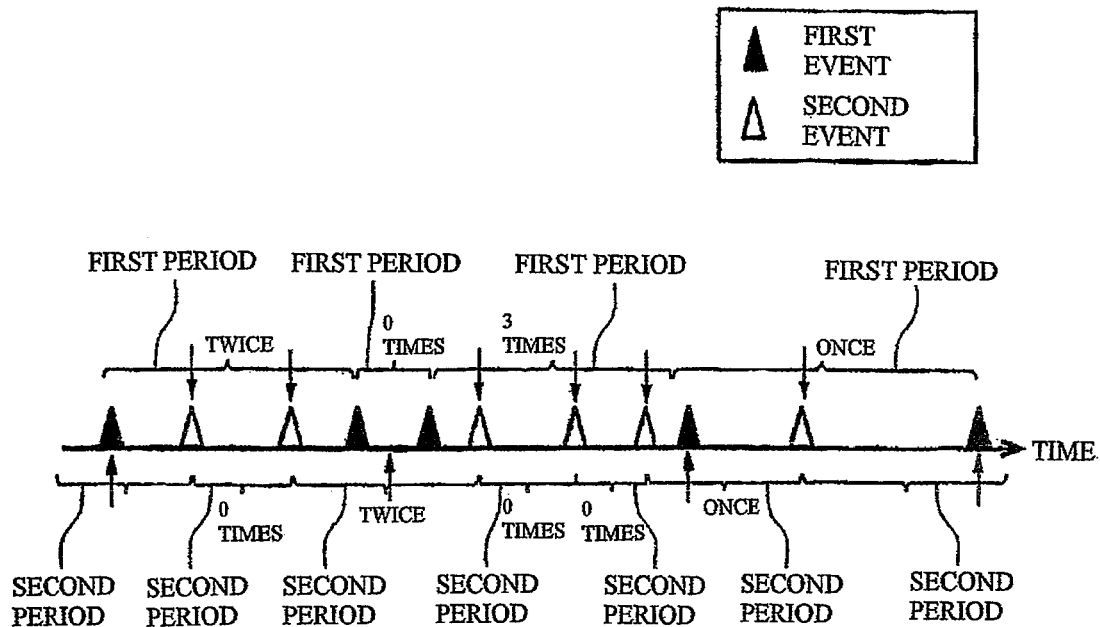
[Figure 10]
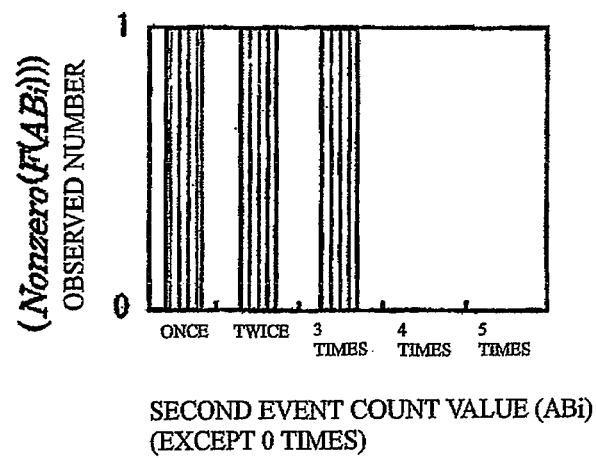
SECOND EVENT COUNT VALUE (ABi)
(EXCEPT 0 TIMES)

[Figure 11]
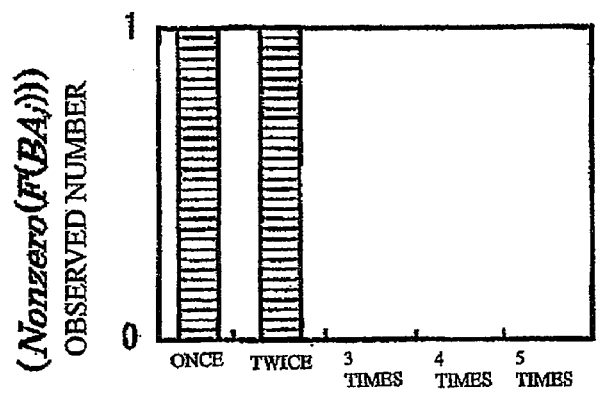
FIRST EVENT COUNT VALUE (BAj)
(EXCEPT 0 TIMES)
[Figure 12]
| | FIRST EVENT COUNT VALUE | ONCE | TWICE | 3 TIMES | 4 TIMES | 5 TIMES |
|---|---|---|---|---|---|---|
| SECOND EVENT COUNT VALUE | Nonzero(F(BAj)) / Nonzero(F(ABi)) | 1 | 1 | 0 | 0 | 0 |
| ONCE | 1 | 1 | 1 | 0 | 0 | 0 |
| TWICE | 1 | 1 | 1 | 0 | 0 | 0 |
| 3 TIMES | 1 | 1 | 1 | 0 | 0 | 0 |
| 4 TIMES | 0 | 0 | 0 | 0 | 0 | 0 |
| 5 TIMES | 0 | 0 | 0 | 0 | 0 | 0 |

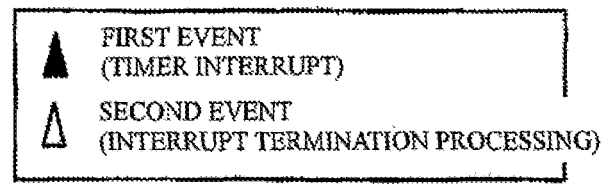
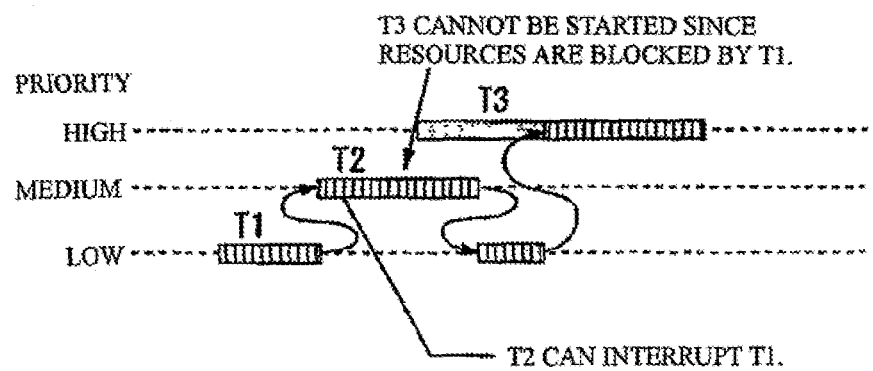

[Figure 15]
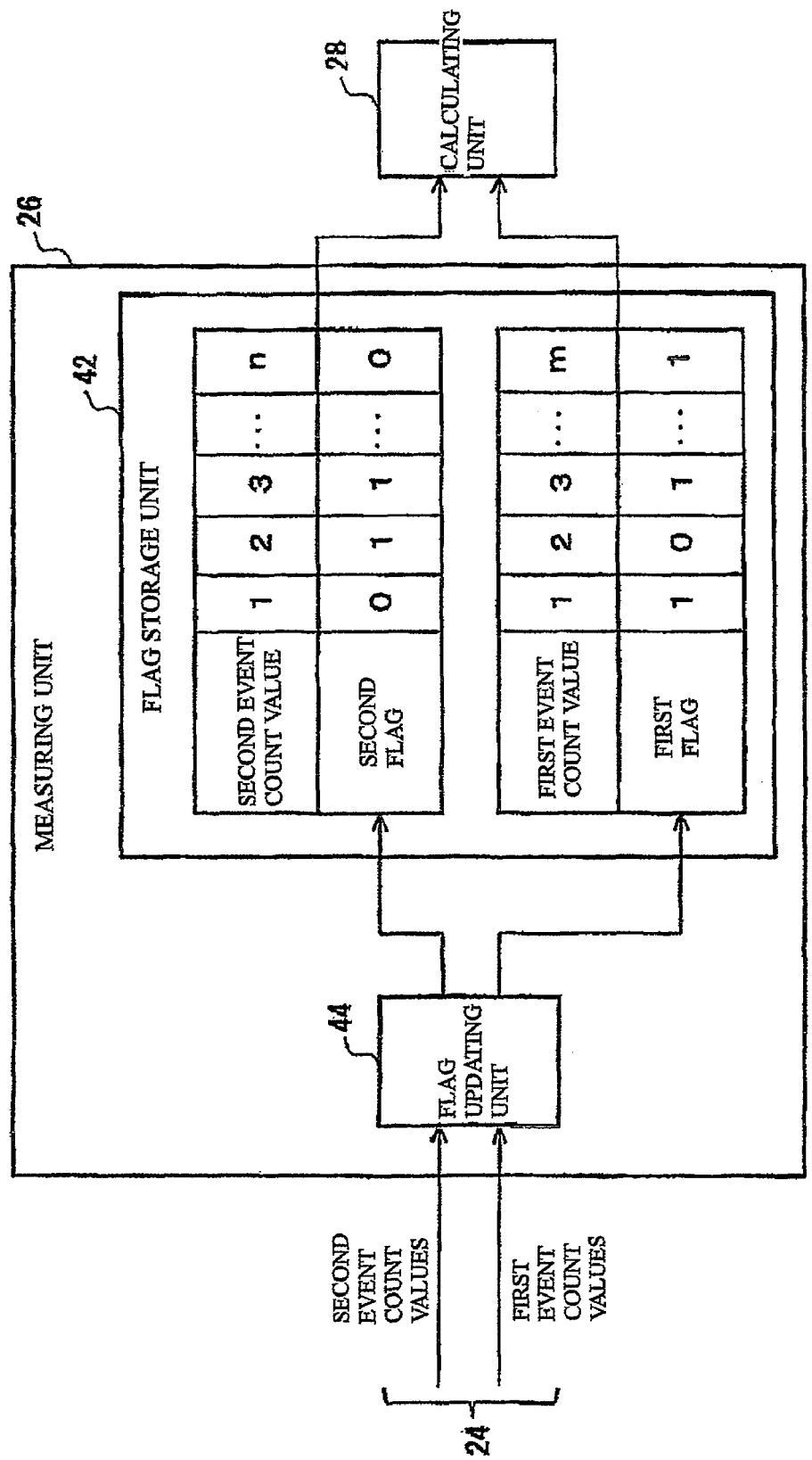

[Figure 16]
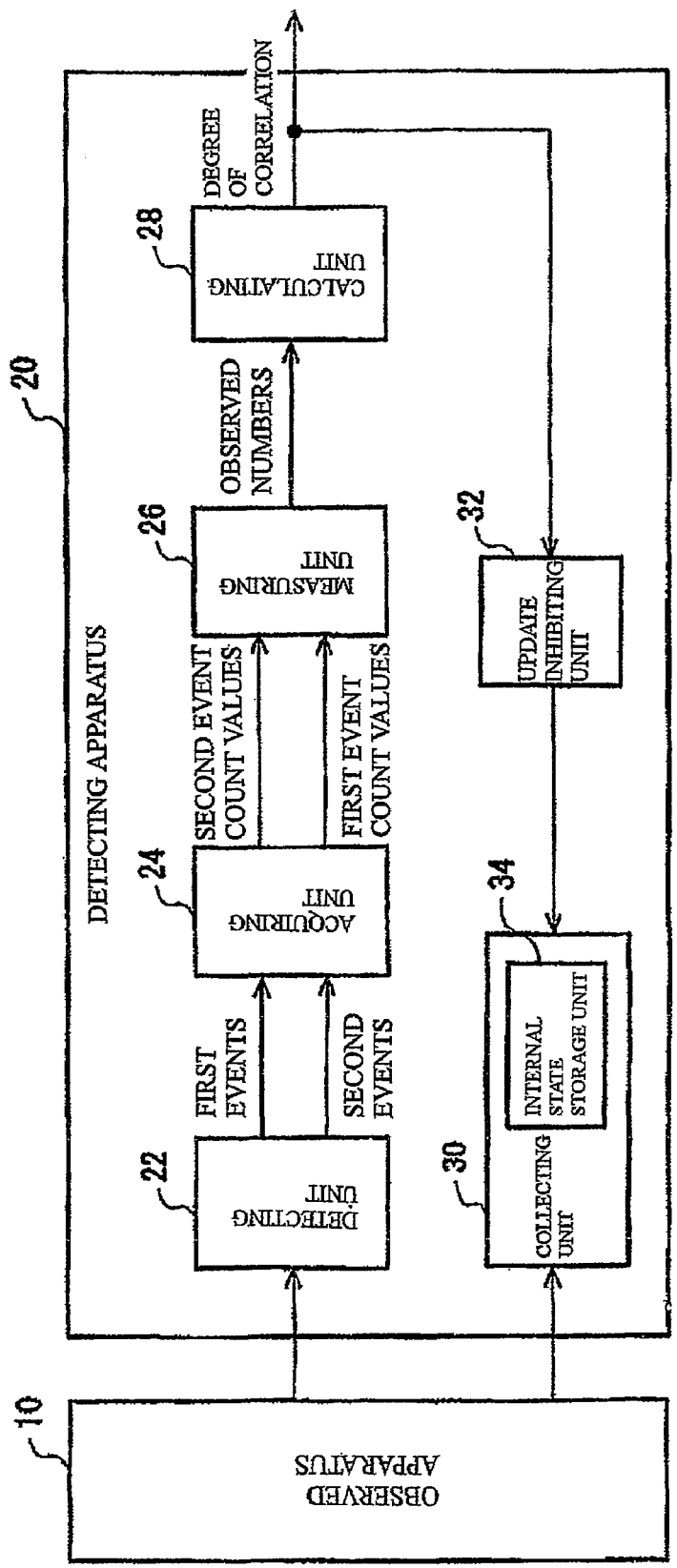

[Figure 17]
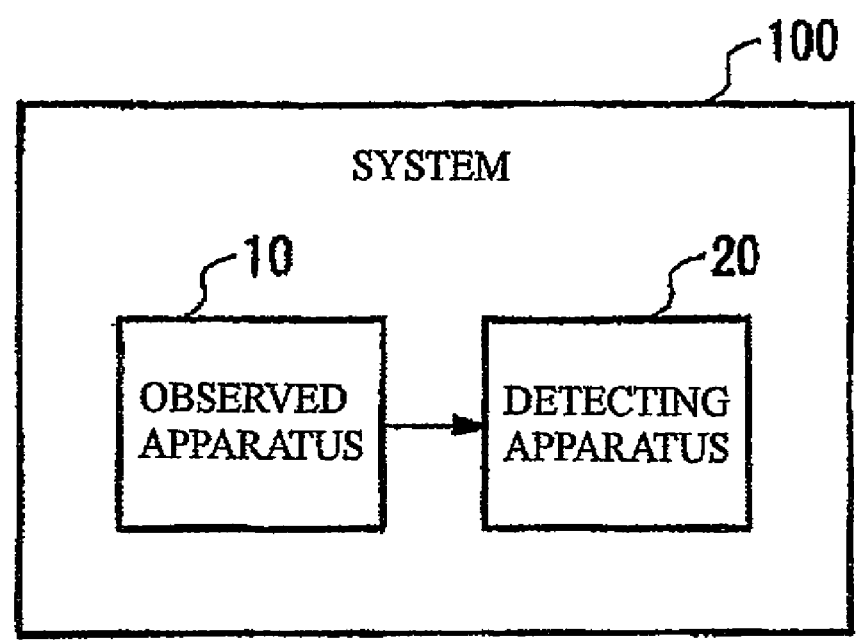

[Figure 18]
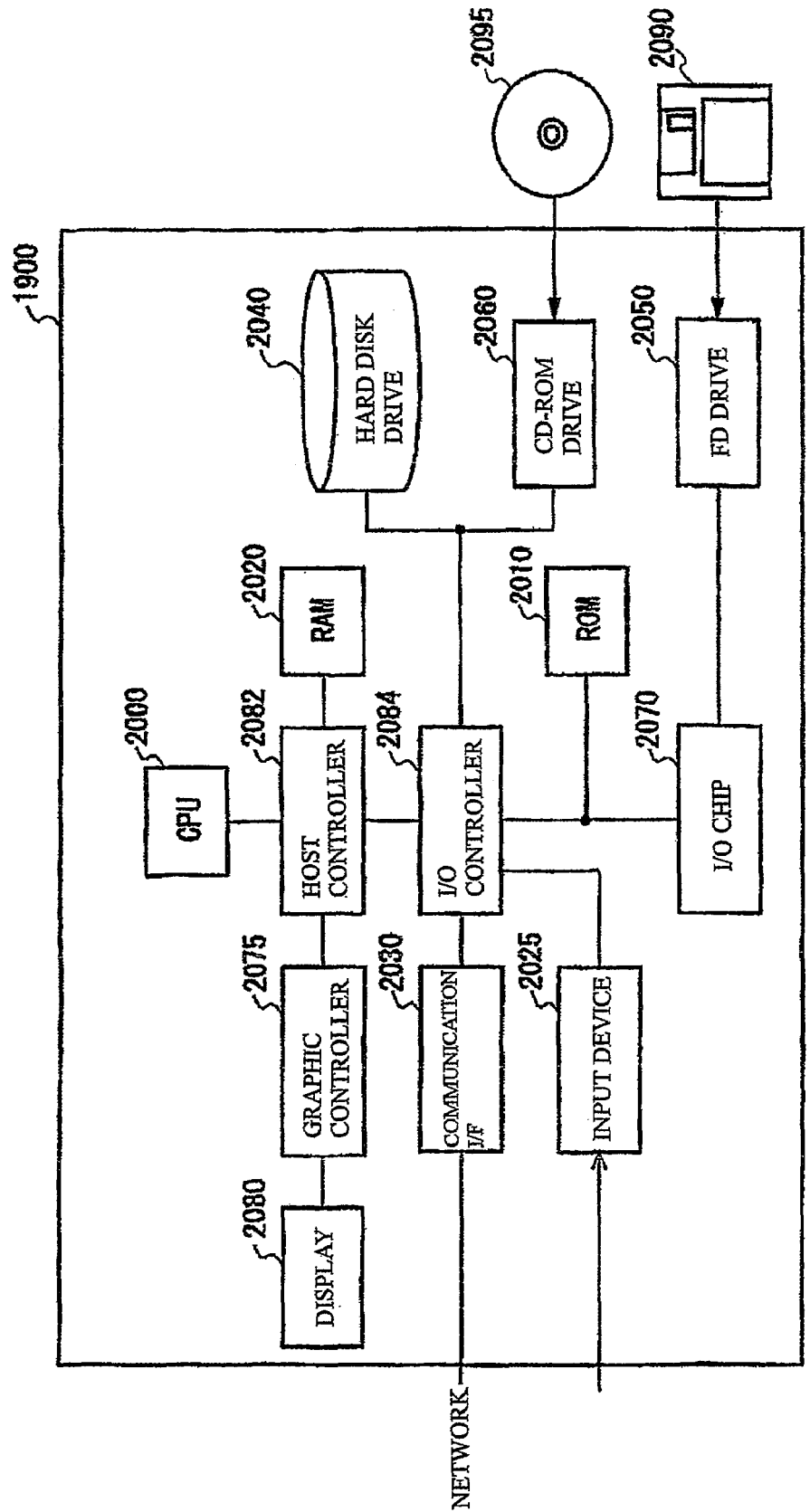

METHOD, APPARATUS, AND PROGRAM FOR DETECTING THE CORRELATION BETWEEN REPEATING EVENTS

PRIORITY CLAIM

The present application claims priority under 35 U.S.C. 119(a-d) to Japanese Patent Application No. JP2006-334864 entitled, "Method, Apparatus, and Program for Detecting the Correlation Between Repeating Events" with a priority date of Dec. 12, 2006.

BACKGROUND OF THE INVENTION

1. Technical Field

The present invention relates to a detecting apparatus, system, program, and detecting method for detecting the degree of correlation between first events and second events repeatedly occurring in an observed apparatus.

2. Description of the Related Art

One known method for verifying hardware includes observing signals output from hardware to be verified with a device such as a logic analyzer. A known method for verifying software includes using a device such as a tracer that sequentially executes executable codes of software to be verified. A known method for verifying software and hardware includes sequentially recording state changes of software or hardware to be verified and performing verification based on information on the statistically processed records.

Known prior art describes a method including making an investigation on a statistical distribution of events in a normal state and determining a theoretical statistical distribution based on the observed values for increasing the accuracy of detecting abnormal events. Additional, a debugging apparatus has been described that uses events generated by the apparatus itself to reproduce execution of parallel programs and to increase the efficiency of debugging. Also described is a program that detects an event occurrence pattern from an event log based on information on a plurality of relationships defined between events and outputs the detected event occurrence pattern.

In the verification methods using a logic analyzer or a tracer, an enormous amount of results are output if the size of hardware or software to be verified is large. Therefore, these methods require predicting and registering bugs that might occur and sequentially deleting output results irrelevant to the registered bugs. Accordingly, this does not achieve efficient verification. In the verification methods using statistical information, it is difficult to analyze correlations between events. In addition, since the verification methods using statistical information require sequentially recording state changes of software or hardware, they require a large memory area if the software or hardware is operated for a long term.

Takemori, et al., "Modeling Techniques About Statistical Theory of Attack Events", The Institute of Electronics, Information and Communications Engineers, published March 2004, describes a method that requires preliminary modeling a statistical distribution of attack events (abnormal events). The debugging apparatus described above requires generating events by the apparatus itself and causing the events to be executed by parallel programs to be debugged.

The program described above requires obtaining the occurrence time of events and also involves complicated processing. In addition, the program excludes occurrence patterns of infrequent events. Therefore, occurrence patterns likely to include bugs are excluded, so that reliable verification cannot be accomplished.

SUMMARY OF THE INVENTION

According to a first aspect of the present invention, there is provided a detecting apparatus that detects a degree of correlation between first events and second events repeatedly occurring in an observed apparatus, including: an acquiring unit that acquires second event count values each indicating the number of second events occurring during each first period between each first event and the first event next thereto; a measuring unit that measures an observed number of each second event count value derived from the number of times the second event count value is observed; and a calculating unit that calculates the degree of correlation between the first events and the second events based on the observed number of each second event count value. There is also provided a system including this detecting apparatus and the observed apparatus.

According to a second aspect of the present invention, there is provided a program for detecting a degree of correlation between first events and second events repeatedly occurring in an information processing apparatus by means of the same or a different information processing apparatus, the program causing the same or the different information processing apparatus to function as: an acquiring unit that acquires second event count values each indicating the number of second events occurring during each first period between each first event and the first event next thereto by means of an input device included in the same or the different information processing apparatus; a measuring unit that measures and stores in a storage device, by means of an instruction processor included in the same or the different information processing apparatus, an observed number of each second event count value acquired by the input device, the observed number being derived from the number of times the second event count value is observed; and a calculating unit that calculates the degree of correlation between the first events and the second events based on the observed number of each second event count value by means of the instruction processor. There is also provided a detecting method implemented by executing this program in the information processing apparatus.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1 shows the configuration of an observed apparatus 10 and a detecting apparatus 20 according to an embodiment of the present invention;

FIG. 2 shows a flow of processing of the detecting apparatus 20 for calculating the degree of correlation between first events and second events;

FIG. 3 shows an exemplary occurrence pattern of the first and second events in the observed apparatus 10;

FIG. 4 shows an example of the frequency of observation (the observed numbers) of second event count values in the case where the events occur with the pattern of FIG. 3 in the observed apparatus 10;

FIG. 5 shows an example of the frequency of observation (the observed numbers) of first event count values in the case where the events occur with the pattern of FIG. 3 in the observed apparatus 10;

FIG. 6 shows an example of values (the observed numbers) indicating whether or not the second event count values are observed in the case where the events occur with the pattern of FIG. 3 in the observed apparatus 10;

FIG. 7 shows an example of values (the observed numbers) indicating whether or not the first event count values are observed in the case where the events occur with the pattern of FIG. 3 in the observed apparatus 10;

FIG. 8 shows the first event count values on the horizontal axis and the second event count values on the vertical axis in the case where the events occur with the pattern of FIG. 3 in the observed apparatus 10;

FIG. 9 shows another exemplary occurrence pattern of the first and second events in the observed apparatus 10;

FIG. 10 shows an example of values (the observed numbers) indicating whether or not the second event count values are observed in the case where the events occur with the pattern of FIG. 9 in the observed apparatus 10;

FIG. 11 shows an example of values (the observed numbers) indicating whether or not the first event count values are observed in the case where the events occur with the pattern of FIG. 9 in the observed apparatus 10;

FIG. 12 shows the first event count values on the horizontal axis and the second event count values on the vertical axis in the case where the events occur with the pattern of FIG. 9 in the observed apparatus 10;

FIG. 13(C) provides a legend showing two triangular symbols respectively representing a first event and a second event, while FIG. 13(A) shows an exemplary event occurrence pattern of the first events (e.g., timer interrupts) and the second events (e.g., interrupt termination processing) correlated to each other, and FIG. 13(B) shows an exemplary event occurrence pattern where a second event (e.g., interrupt termination processing) delays in the event occurrence pattern of FIG. 13(A);

FIG. 14 shows task processing in the case where a correlation occurs between uncorrelated tasks (T2 and T3) due to a reversal of priority;

FIG. 15 shows the configuration of a measuring unit 26 and a calculating unit 28 according to a first variation of the embodiment;

FIG. 16 shows the configuration of the observed apparatus 10 and the detecting apparatus 20 according to a second variation of the embodiment;

FIG. 17 shows the configuration of the observed apparatus 10 and the detecting apparatus 20 according to a third variation of the embodiment; and FIG. 18 shows an exemplary hardware configuration of a computer 1900 according to an embodiment of the present invention.

DETAILED DESCRIPTION

The present invention will now be described below with respect to its embodiments. The embodiments below are not intended to limit the present invention defined in the claims, and not all combinations of features described in the embodiments are essential for means to realize the present invention.

FIG. 1 shows the configuration of an observed apparatus 10 and a detecting apparatus 20 according to an embodiment. The detecting apparatus 20 detects the degree of correlation between first events and second events repeatedly occurring in the observed apparatus 10.

The observed apparatus 10 is an apparatus to be observed, and it may be a common apparatus, a common circuit, or an information processing apparatus operating with cooperation of hardware and software. The observed apparatus 10 may also be a hardware simulator including an FPGA or the like in which a logic circuit to be verified is programmed, or an apparatus including one or more LSIs or the like implementing a logic circuit to be verified. The observed apparatus 10 may also be an information processing apparatus that simulates a logic circuit to be verified by executing software such as a logic circuit simulator.

The events occurring in the observed apparatus 10 refer to changes in the state of hardware and software in the observed apparatus 10. For example, a hardware state change may be a change in a certain state of hardware, such as a voltage change on a particular signal line, inversion of a value stored in a flip-flop (e.g., a register), state transition of a state machine, occurrence of an interrupt signal, a change of a value stored in memory, or ON/OFF of a lamp. A software state change may be a change in a certain state of software, such as the start/end of a task, execution of an instruction at a focused address, occurrence of a software interrupt, execution of a particular instruction by a software module, or a change of a variable.

Here, the presence of a correlation between the first events and the second events refers to the presence of some kind of relation between the first events and the second events. For example, if many of startups of a function B (the first events) are caused by a call instruction from a function A (the second events), or if toggling of an interrupt line (the first events) causes startups of a handler performing corresponding interrupt processing (the second events), there is a correlation between the first events and the second events. The detecting apparatus 20 detects the strength of correlation between the first events and the second events occurring in the observed apparatus 10 as the degree of correlation represented by a value. As an example, the detecting apparatus 20 outputs the degree of correlation represented by such a value as is one for the strongest correlation between the first events and the second events and approaches zero as the correlation becomes weaker than the strongest degree.

The detecting apparatus 20 includes a detecting unit 22, an acquiring unit 24, a measuring unit 26, and a calculating unit 28. The detecting unit 22 detects the occurrence of the first and second events in the observed apparatus 10. As an example, the detecting unit 22 may detect the occurrence of the first and second events in the observed apparatus 10 by detecting control signals, call instructions and interrupt instructions of software, and so on, that are output from the observed apparatus 10 during operation.

The acquiring unit 24 counts the number of second events occurring during each first period, which is a period between each first event and the first event next thereto. In addition, the acquiring unit 24 counts the number of first events occurring during each second period, which is a period between each second event and the second event next thereto. Then, the acquiring unit 24 acquires second event count values, each indicating the number of second events occurring in each first period between each first event and the first event next thereto. In addition, the acquiring unit 24 further acquires first event count values, each indicating the number of first events occurring in each second period between each second event and the second event next thereto.

As an example, the acquiring unit 24 may acquire the second and first event count values for each predetermined measurement period during continuous operation of the observed apparatus 10. Also as an example, the acquiring unit 24 may record a log of the occurrence of the first and second events detected by the detecting unit 22 during operation of the observed apparatus 10. The acquiring unit 24 may then acquire the second and first event count values for each predetermined measurement period from the log, for example after the operation of the observed apparatus 10 is finished.

The measuring unit 26 measures an observed number of each second event count value derived from the number of times the second event count value is observed. In addition, the measuring unit 26 further measures an observed number of each first event count value derived from the number of times the first event count value is observed. As an example, the measuring unit 26 may measure the observed number of each second event count value and the observed number of each first event count value for each measurement period.

The observed number as used herein is a concept including various expression forms in which a data value varies depending on the number of times an event count value is observed. As an example, the observed number may be the frequency (the number) of observations of an event count value, the ratio of the number of observations of an event count value, whether or not an event count value is observed, or whether or not an event count value exceeds a threshold. That is, the measuring unit 26 may, for example, measure the frequency of observations of each event count value during a measurement period and output the result of this measurement as the observed number. The measuring unit 26 may measure the ratio of the frequency of observations of each event count value to the overall frequencies during a measurement period and output the result of this measurement as the observed number. The measuring unit 26 may, for example, measure whether or not each event count value is observed during a measurement period and output the result of this measurement as the observed number.

The calculating unit 28 calculates the degree of correlation between the first events and the second events occurring in the observed apparatus 10 based on the observed number of each second event count value and each first event count value. In this embodiment, the calculating unit 28 calculates the degree of correlation between the first events and the second events occurring in the observed apparatus 10 based on the number of second event count values with the observed number not less than a predetermined threshold and the number of first event count values with the observed number not less than a predetermined threshold. The calculating unit 28 may, for example, calculate the degree of correlation between the first events and the second events occurring in the observed apparatus 10 based on the number of second event count values observed at least once during a measurement period and the number of first event count values observed at least once during the measurement period. The calculating unit 28 may, for example, calculate the degree of correlation between the first events and the second events occurring in the observed apparatus 10 based on the number of second event count values observed for the number of times not less than a predetermined threshold during a measurement period and the number of first event count values observed for the number of times not less than a predetermined threshold during the measurement period.

The calculating unit 28 may, for example, calculate the degree of correlation between the first events and the second events occurring in the observed apparatus 10 for each of a plurality of measurement periods during a preset term, for which the observed apparatus 10 is continuously operating. This allows the calculating unit 28 to detect changes in the degree of correlation between the first events and the second events while the observed apparatus 10 is continuously operated for a long term.

The calculating unit 28 may, for example, calculate the correlation between the first events and the second events based on the observed number of each second event count value. That is, the calculating unit 28 may calculate the correlation between the first events and the second events without using the observed number of each first event count value. In that case, the acquiring unit 24 may acquire only the second event count values, and the measuring unit 26 may measure the observed number of each second event count value. Alternatively, the calculating unit 28 may, for example, calculate the correlation based on the first event count values if the number of first events is not less than the number of second events during a predetermined period, or based on the second event count values if the number of second events exceeds the number of first events during the predetermined period.

FIG. 2 shows a flow of processing of the detecting apparatus 20 for calculating the degree of correlation between the first events and the second events. Once operation of the observed apparatus 10 starts, the detecting unit 22 first detects the occurrence of the first and second events in the observed apparatus 10 (S1002).

The acquiring unit 24 then acquires the second event count value for each first period between each first event and the first event next thereto during a measurement period (S1004-1). The acquiring unit 24 also acquires the first event count value for each second period between each second event and the second event next thereto during the measurement period (S1004-2). The acquiring unit 24 may acquire the second and first event count values in real time during the operation of the observed apparatus 10, or may acquire the second and first event count values from a log of the occurrence of the first and second events generated by the detecting unit 22 after the operation of the observed apparatus 10 ends.

The measuring unit 26 then measures the observed number of each second event count value (S1006-1). The measuring unit 26 also measures the observed number of each first event count value (S1006-2).

The calculating unit 28 calculates the degree of correlation between the first events and the second events occurring in the observed apparatus 10 based on the observed number of each second event count value and the observed number of each first event count value (S1008).

As an example, the calculating unit 28 may calculate the degree of correlation between the first events and the second events by calculation expressed in the following equation (1) or (2). The equation (2) is a variation of the equation (1).

$$C_{AB} = \frac{1}{\sum_{i=1}^{NB} \sum_{j=1}^{NA} [Nonzero(F(AB_i)) \times Nonzero(F(BA_j))]} \quad (1)$$

$$C_{AB} = \frac{1}{\left[\sum_{i=1}^{NB} Nonzero(F(AB_i))\right] \times \left[\sum_{j=1}^{NA} Nonzero(F(BA_j))\right]} \quad (2)$$

Details of the variables and functions in the equations (1) and (2) are as follows. $C_{AB}$ represents the degree of correlation between the first events and the second events. $AB_i$ represents an i-th second event count value (i is an integer equal to or greater than one), and $F(AB_i)$ represents the frequency of occurrence of the i-th second event count value. $BA_j$ represents a j-th first event count value (j is an integer equal to or greater than one), and $F(BA_j)$ represents the frequency of occurrence of the j-th first event count value.

Nonzero(X) is a function that results in zero if X is zero and results in one if X is not zero. Therefore, Nonzero(F(ABi)) results in one if the i-th second event count value occurs at least once, and results in zero if the i-th second event count value never occurs. Nonzero(F(BAj)) results in one if the j-th first event count value occurs at least once, and results in zero if the j-th first event count value never occurs.

$N_A$ represents the total number of occurrences of the first events. It is assumed that at least one first event occurs ($N_A>0$). $N_B$ represents the total number of occurrences of the second events. It is assumed that at least one second event occurs ($N_B>0$).

Thus, the calculating unit 28, performing the above calculation, calculates the degree of correlation by using the function that includes the product of the number of the second event count values with the observed number being nonzero and the number of the first event count values with the observed number being nonzero. For example, as the degree of correlation ($C_{AB}$), the calculating unit 28 may calculate the inverse of a value (the value of the denominator on the right side of the equation (2)) obtained by multiplying the number of the second event count values with the observed number being nonzero (the value in the left brackets of the denominator on the right side of the equation (2)) by the number of the first event count values with the observed number being nonzero (the value in the right brackets of the denominator on the right side of the equation (2)). This allows the calculating unit 28 to calculate the degree of correlation represented by such a value as is one for the strongest correlation between the first events and the second events and approaches zero as the correlation becomes weaker.

The calculating unit 28 may calculate the degree of correlation based on the number of the nonzero second event count values with the observed number being nonzero and the number of the nonzero first event count values with the observed number being nonzero on condition that the first and second event count values are nonzero. As an example, the calculating unit 28 may calculate the degree of correlation based on the number of the second event count values (Nonzero (F(ABi))=1) where AB≠0 and F(ABi)≠0 and the number of the first event count values (Nonzero (F(BAj))=1) where BA≠0 and F(BAj)≠0. This allows the calculating unit 28 to have a more appropriate value as the degree of correlation between the first events and the second events occurring synchronously at a predetermined occurrence rate. For example, the calculating unit 28 can have the value one as the degree of correlation in such a case that the second event always occurs once for every N first events (N is an integer equal to or greater than one).

Instead of calculating the degree of correlation based on the number of the first and second event count values with the observed number being nonzero as above, the calculating unit 28 may calculate the degree of correlation based on the number of the first event count values with the observed number not less than a predetermined threshold and the number of the second event count values with the observed number not less than a predetermined threshold.

The calculating unit 28 may also calculate the degree of correlation using an arbitrary constant as the value of the numerator on the right side of the equations (1) and (2). That is, the calculating unit 28 may calculate the degree of correlation by obtaining the inverse of the product of the number of the second event count values with the observed number being nonzero and the number of the first event count values with the observed number being nonzero, and further multiplying the inverse by a constant. Alternatively, the calculating unit 28 may calculate the degree of correlation by multiplying the inverse of the product by the constant and further adding another constant thereto.

The calculating unit 28 may also calculate the degree of correlation using an equation that subtracts the expression on the right side of the equations (1) and (2) from a constant. That is, the calculating unit 28 may calculate the degree of correlation by inverting the sign of the inverse of the product of the number of the second event count values with the observed number being nonzero and the number of the first event count values with the observed number being nonzero, and further adding a constant thereto. Alternatively, the calculating unit 28 may calculate the degree of correlation by dividing another constant by the value obtained by inverting the sign of the inverse of the product and adding the constant.

With the above-described detecting apparatus 20, the degree of correlation between the first events and the second events in the observed apparatus 10 can be readily calculated. The detecting apparatus 20 can utilize the degree of correlation between the first events and the second events to efficiently carry out verification, debugging, and so on of the observed apparatus 10.

Furthermore, the detecting apparatus 20 may detect changing points of the degree of correlation sequentially generated for each measurement period and, based on the position of the detected changing points, identify a point (an anomaly point) indicating an irregular operation in the observed apparatus 10 and therefore likely to have a defect. The detecting apparatus 20 may notify a device at a subsequent stage, such as a verifying device, of the identified anomaly point to cause the device to verify the operation of the observed apparatus 10 in the vicinity of the anomaly point. Thus, the detecting apparatus 20 can efficiently carry out verification, debugging, and so on of the observed apparatus 10.

Moreover, for the detection of an anomaly point, the detecting apparatus 20 does not need preliminary registration of data such as occurrence patterns of events expected to occur at the anomaly point. Therefore, the detecting apparatus 20 can reliably detect even an anomaly point resulting from a cause such as a hard-to-predict defect and an anomaly point resulting from an occurrence pattern of events that are infrequent and therefore hard to detect.

In addition, the detecting apparatus 20 allows appropriate verification, debugging, and so on of the observed apparatus 10 even when the observed apparatus 10 is operated for a long term. That is, the observed apparatus 10 may be continuously operated for a long term to sequentially obtain its internal state. The internal state only in the vicinity of an anomaly point detected by the detecting apparatus 20 may be stored while the internal state of the observed apparatus 10 other than that in the vicinity of the anomaly point may be sequentially deleted. Therefore, a verifying device or a debugging device that detects the anomaly point by utilizing the degree of correlation output from the detecting apparatus 20 need not store a large amount of internal state generated in the continuous operation of the observed apparatus 10. This allows processing such as verification to be performed without causing memory overflow even when the observed apparatus 10 is operated for a long term.

FIG. 3 shows an exemplary occurrence pattern of the first and second events in the observed apparatus 10. FIG. 4 shows an example of the frequency of observation (the observed numbers) of the second event count values in the case where the events occur with the pattern of FIG. 3 in the observed apparatus 10. FIG. 5 shows an example of the frequency of observation (the observed numbers) of the first event count values in the case where the events occur with the pattern of FIG. 3 in the observed apparatus 10.

For example, the observed apparatus 10 may repeatedly generate the pattern of FIG. 3, in which one first event occurs, followed by two second events. In this case, as shown in FIG. 4, the measuring unit 26 obtains the observed numbers ($F(AB_0)=0$, $F(AB_1)=0$, $F(AB_2)=240$, $F(AB_3)=0$, $F(AB_4)=0$, $F(AB_5)=0$) for the second event count values ($AB_0$, $AB_1$, $AB_2$, $AB_3$, $AB_4$, $AB_5$) respectively. Also, as shown in FIG. 5, the measuring unit 26 obtains the observed numbers ($F(BA_0)=240$, $F(BA_1)=240$, $F(BA_2)=0$, $F(BA_3)=0$, $F(BA_4)=0$, $F(BA_5)=0$) for the first event count values ($BA_0$, $BA_1$, $BA_2$, $BA_3$, $BA_4$, $BA_5$) respectively.

FIG. 6 shows an example of values (the observed numbers) indicating whether or not the second event count values are observed in the case where the events occur with the pattern of FIG. 3 in the observed apparatus 10. FIG. 7 shows an example of values (the observed numbers) indicating whether or not the first event count values are observed in the case where the events occur with the pattern of FIG. 3 in the observed apparatus 10.

The measuring unit 26 uses the Nonzero function to convert the observed number ($AB_1$ to $AB_5$) of each second event count value shown in FIG. 4 except the second event count value of zero into a value indicating whether or not the second event count value is observed. The measuring unit 26 outputs the value as the observed number of each second event count value. That is, as shown in FIG. 6, the measuring unit 26 obtains the observed numbers (Nonzero($F(AB_1)$)=0, Nonzero($F(AB_2)$)=1, Nonzero($F(AB_3)$)=0, Nonzero($F(AB_4)$)=0, Nonzero($F(AB_5)$)=0) of the second event count values ($AB_1$, $AB_2$, $AB_3$, $AB_4$, $AB_5$) except $AB_0$ respectively. The measuring unit 26 also uses the Nonzero function to convert the observed number of each first event count value shown in FIG. 5 except the first event count value of zero into a value indicating whether or not the first event count value is observed. The measuring unit 26 outputs the value as the observed number of each first event count value. That is, as shown in FIG. 7, the measuring unit 26 obtains the observed numbers (Nonzero($F(BA_1)$)=1, Nonzero($F(BA_2)$)=0, Nonzero($F(BA_3)$)=0, Nonzero($F(BA_4)$)=0, Nonzero($F(BA_5)$)=0) of the first event count values ($BA_1$, $BA_2$, $BA_3$, $BA_4$, $BA_5$) except $BA_0$ respectively.

FIG. 8 shows the first event count values on the horizontal axis and the second event count values on the vertical axis in the case where the events occur with the pattern of FIG. 3 in the observed apparatus 10. FIG. 8 further shows that 1 is set at the intersection of a row and column both of which contain 1 as the value indicating whether or not the first and second event count values are detected respectively, and that 0 is set at the intersection of a row and column at least one of which contains 0.

The calculating unit 28 calculates the number of the event count values with the second event count value being observed, i.e., the number of the event count values with the observed number (Nonzero($F(AB_i)$)=1. The calculating unit 28 also calculates the number of the event count values with the first event count being observed, i.e., the number of the event count values with the observed number (Nonzero($F(BA_j)$)=1. In the case where the events occur with the pattern of FIG. 3 in the observed apparatus 10, the calculating unit 28 obtains the value one as the number of the event count values with the second event count being observed and the value one as the number of the event count values with the first event count being observed.

The calculating unit 28 then calculates the product ($1 \times 1=1$ in this example) of the number of the event count values with the second event count being observed (1 in this example) and the number of the event count values with the first event count being observed (1 in this example). As an example, as the product of the number of the second event count values with the observed number being nonzero and the number of the first event count values with the observed number being nonzero, the calculating unit 28 may calculate the number of intersections in the table shown in FIG. 8 at which both the row and column contain 1 as the value indicating whether or not the first and second event count values are detected respectively.

The calculating unit 28 may then output the inverse (1 in this example) of the obtained product (the number of 1s in the table of FIG. 8) as the degree of correlation. As shown in the above FIGS. 3 to 8, the detecting apparatus 20 can calculate the degree of correlation of the first events and the second events having a relatively strong correlation in a simple manner.

FIG. 9 shows another exemplary occurrence pattern of the first and second events in the observed apparatus 10. FIG. 10 shows an example of values (the observed numbers) indicating whether or not the second event count values are observed in the case where the events occur with the pattern of FIG. 9 in the observed apparatus 10. FIG. 11 shows an example of values (the observed numbers) indicating whether or not the first event count values are observed in the case where the events occur with the pattern of FIG. 9 in the observed apparatus 10.

For example, the observed apparatus 10 may repeatedly generate the pattern of FIG. 9, in which one first event occurs, followed by two second events, two first events, three second events, one first event, and one second event. In this case, as shown in FIG. 10, the measuring unit 26 obtains the observed numbers (Nonzero($F(AB_1)$)=1, Nonzero($F(AB_2)$)=1, Nonzero($F(AB_3)$)=1, Nonzero($F(AB_4)$)=0, Nonzero($F(AB_5)$)=0) of the second event count values ($AB_1$, $AB_2$, $AB_3$, $AB_4$, $AB_5$) except $AB_0$ respectively. Also, as shown in FIG. 11, the measuring unit 26 obtains the observed numbers (Nonzero($F(BA_1)$)=1, Nonzero($F(BA_2)$)=1, Nonzero($F(BA_3)$)=0, Nonzero($F(BA_4)$)=0, Nonzero($F(BA_5)$)=0) of the first event count values ($BA_1$, $BA_2$, $BA_3$, $BA_4$, $BA_5$) except $BA_0$ respectively.

FIG. 12 shows the first event count values on the horizontal axis and the second event count values on the vertical axis in the case where the events occur with the pattern of FIG. 9 in the observed apparatus 10. FIG. 12 further shows that 1 is set at the intersection of a row and column both of which contain 1 as the value indicating whether or not the first and second event count values are detected respectively, and that 0 is set at the intersection of a row and column at least one of which contains 0.

The calculating unit 28 calculates the number of the event count values with the second event count value being observed, i.e., the number of the event count values with the observed number (Nonzero($F(AB_i)$)=1. The calculating unit 28 also calculates the number of the event count values with the first event count value being observed, i.e., the number of event count values with the observed number (Nonzero($F(BA_j)$)=1. In the case where the events occur with the pattern of FIG. 9 in the observed apparatus 10, the calculating unit 28 obtains the value three as the number of the event count values with the second event count value being observed and the value two as the number of the event count values with the first event count value being observed.

The calculating unit 28 then calculates the product ($3 \times 2=6$ in this example) of the number of the event count values with the second event count value being observed (3 in this example) and the number of the event count values with the first event count value being observed (2 in this example). As an example, as the product of the number of second event count values with the observed number being nonzero and the number of first event count values with the observed number being nonzero, the calculating unit 28 may calculate the number of intersections in the table shown in FIG. 12 at which both the row and column contain 1 as the value indicating whether or not the first and second event count values are detected respectively.

The calculating unit 28 may then output the inverse (⅙ in this example) of the obtained product (the number of 1s in the table of FIG. 12) as the degree of correlation. As shown in the above FIGS. 9 to 12, the detecting apparatus 29 can calculate the degree of correlation of the first events and the second events having a relatively weak correlation in a simple manner.

FIG. 13(A) shows an exemplary event occurrence pattern of the first events (e.g., timer interrupts) and the second events (e.g., interrupt termination processing) correlated to each other. FIG. 13(B) shows an exemplary event occurrence pattern where a second event (e.g., interrupt termination processing) delays in the event occurrence pattern of FIG. 13(A).

As an example, the detecting apparatus 20 can verify whether or not the first events and the second events are operating normally based on the degree of correlation between the first events and the second events supposed to have a strong correlation. For example, the observed apparatus 10 may start a function K once every millisecond by using a timer interrupt generated once every 100 milliseconds. With the timer interrupts being the first events and the startups of the function K being the second events, the detecting apparatus 20 should output 1 as the degree of correlation between the first events and the second events. Therefore, the detecting apparatus 20 can verify whether or not the observed apparatus 10 is operating normally by determining whether or not the output result (the degree of correlation) is 1.

Furthermore, for example, the observed apparatus 10 may be supposed to complete the processing of the function K within one millisecond. As shown in FIG. 13(A), with the timer interrupts being the first events and the interrupt termination processing being the second events, each second event (interrupt termination processing) occurs before the next first event (a timer interrupt). The detecting apparatus 20 should output 1 as the output result (the degree of correlation).

However, if the function K called at a certain time does not finish and causes delay of the interrupt termination processing for some reason, the interrupt termination processing (the second event) occurs after the next timer interrupt (the first event). This causes a period between a first event and the next first event in which two second events occur, and the detecting apparatus 20 outputs ½ as the degree of correlation in this measurement period. Therefore, the detecting apparatus 20 can detect an anomaly point indicating abnormal operation of the observed apparatus 10 by detecting a decrease in the degree of correlation between the first events and the second events having a strong correlation.

FIG. 14 shows task processing in the case where a correlation occurs between uncorrelated tasks (T2 and T3) due to a reversal of priority. Exemplary cases where the degree of correlation between the first events and the second events supposed to have no or little correlation increases include the following: when inappropriate priority is set for tasks, when an inappropriate exclusive control procedure is set, when long-term interrupt disable processing is performed, and when priority is reversed. Therefore, the detecting apparatus 20 can detect an anomaly point indicating abnormal operation of the observed apparatus 10 by detecting an increase in the degree of correlation between the first events and the second events supposed to have no or little correlation.

For example, the observed apparatus 10 executes tasks T1, T2, and T3 shown in FIG. 14. In execution, the observed apparatus 10 gives the highest priority to the task T3, the next highest priority to the task T2, and the lowest priority to the task T1. The tasks T1 and T3 exclusively share resources of the observed apparatus 10. The tasks T2 and T3 supposed to have no correlation with each other.

Here, the observed apparatus 10 calls the task T2 while executing the task T1 and then calls the task T3. The observed apparatus 10 executes the task T2 according to priority over the task T1. Since the task T3 has a further higher priority than the task T2, the task T3 should interrupt the task T2. However, since the task T1 has acquired the resources, the observed apparatus 10 cannot execute the task T3 until the task T1 is completed (i.e., the task T2 is completed). As a result, the task T2 is actually given priority over the task T3.

Thus, when the priority between the task T2 and the task T3 is reversed, the correlation between the tasks T2 and T3 supposed to be uncorrelated increases due to an order relation created between them. Therefore, the detecting apparatus 20 can detect a point of the occurrence of a phenomenon such as the reversal of priority by detecting an anomaly point at which the correlation between events originally having a weak correlation increases.

FIG. 15 shows the configuration of the measuring unit 26 and the calculating unit 28 according to a first variation of this embodiment. Since this variation adopts almost the same configuration and functions as in the detecting apparatus 20 shown in FIG. 1, only the differences will be described below.

The measuring unit 26 according to this variation includes a flag storage unit 42 and a flag updating unit 44. The flag storage unit 42 records, as the observed number, a first flag for each first event count value indicating whether or not the first event count value is observed and a second flag for each second event count value indicating whether or not the second event count value is observed. As an example, the flag storage unit 42 may record the first flag for each first event count value except zero and the second flag for each second event count value except zero.

The flag updating unit 44 sets the first flag corresponding to each observed first event count value to the logical value 1 and sets the second flag corresponding to each observed second event count value to the logical value 1. As an example, the flag updating unit 44 initializes the first and second flags recorded in the flag storage unit 42 to the logical value 0 at the start of a measurement period. The flag updating unit 44 may then judge the first and second event count values sequentially input during the measurement period and set the first and second flags for their corresponding event count values to the logical value 1.

The calculating unit 28 calculates the degree of correlation by using a function that includes the product of the number of first flags set to the logical value 1 and the number of second flags set to the logical value 1. According to the above-described first variation, the observed number of each first event count value and the observed number of each second event count value can be readily generated.

FIG. 16 shows the configuration of the observed apparatus 10 and the detecting apparatus 20 according to a second variation of this embodiment. Since this variation adopts almost the same configuration and functions as in the observed apparatus 10 and the detecting apparatus 20 shown in FIG. 1, only the differences will be described below.

The detecting apparatus 20 further includes a collecting unit 30 and an update inhibiting unit 32. The collecting unit 30 collects the internal state of at least part of the observed apparatus 10 at predetermined intervals into an internal state storage unit 34. As an example, the collecting unit 30 may collect the internal state of the observed apparatus 10 into the internal state storage unit 34 in parallel with the detection of the first and second events by the detecting unit 22 during the operation of the observed apparatus 10. Exemplary internal states of the observed apparatus 10 that may be collected by the collecting unit 30 include the voltage on a signal line, a value stored in a flop-flop (e.g., a register), the state of a state machine, the state of an interrupt signal, a value stored in memory, the execution state of a task, the execution state of an instruction at a focused address, the occurrence state of a software interrupt, a variable, and so on.

As an example, the collecting unit 30 may sequentially record information representing the collected internal state of the observed apparatus 10 in the internal state storage unit 34 in order of time. Also as an example, if more than a predetermined amount of internal state information is stored in the internal state storage unit 34, the collecting unit 30 may sequentially delete the earliest item of the information.

The update inhibiting unit 32 inhibits updating of the internal state stored in the internal state storage unit 34 and saves the internal state in at least one of the case where the degree of correlation is above a predetermined upper limit and the case where the degree of correlation is below a predetermined lower limit. As an example, the update inhibiting unit 32 may inhibit updating of the internal state stored in the internal state storage unit 34 and save the internal state when the degree of correlation has changed from that obtained immediately before. According to the above-described second variation, the internal state of the observed apparatus 10 at a point likely to have a defect can be saved. This allows efficient verification, debugging, and so on of the observed apparatus 10.

FIG. 17 shows the configuration of the observed apparatus 10 and the detecting apparatus 20 according to a third variation of this embodiment. A system 100 includes the observed apparatus 10 and the detecting apparatus 20. Since the observed apparatus 10 and the detecting apparatus 20 have almost the same configuration and functions as those shown in FIG. 1 respectively, only the differences will be described in detail below.

The observed apparatus 10 and the detecting apparatus 20 are incorporated into a single apparatus. As an example, the observed apparatus 10 and the detecting apparatus 20 may be implemented on a single IC chip, a single module, or a single substrate. If the observed apparatus 10 is implemented by an information processing apparatus executing an observed program, the detecting apparatus 20 may be implemented by executing a program on the same information processing apparatus. According to the above-described third variation, the detecting apparatus 20 is incorporated into the observed apparatus 10 itself. Therefore, operations such as connecting the detecting apparatus 20 to the observed apparatus 10 in verification or debugging can be eliminated to simplify the verification or debugging.

FIG. 18 shows an exemplary hardware configuration of a computer 1900 according to an embodiment of the present invention. The computer 1900 according to this embodiment has a CPU peripheral section including a CPU 2000 serving as an instruction processor, a RAM 2020, a graphic controller 2075, and a display 2080, which are interconnected via a host controller 2082. The computer 1900 also has an I/O section including an input device 2025, a communication interface 2030, a hard disk drive 2040, and a CD-ROM drive 2060, which are connected to the host controller 2082 via an I/O controller 2084. Moreover, the computer 1900 has a legacy I/O section including a ROM 2010, a flexible disk drive 2050, and an I/O chip 2070, which are connected to the I/O controller 2084.

The host controller 2082 connects the RAM 2020 with the CPU 2000 and the graphic controller 2075 that access the RAM 2020 at high transfer rates. The CPU 2000 operates according to programs stored in the ROM 2010 and the RAM 2020 to control various components. The graphic controller 2075 obtains image data generated by the CPU 2000 and other components in a frame buffer provided in the RAM 2020 to cause images to be displayed on the display 2080. Alternatively, the graphic controller 2075 may include a frame buffer for storing image data generated by the CPU 2000 and other components.

The I/O controller 2084 connects the host controller 2082 with the input device 2025 that inputs information from other apparatuses, and with the communication interface 2030, the hard disk drive 2040, and the CD-ROM drive 2060, which are relatively fast I/O devices. The communication interface 2030 communicates with other apparatuses over a network. The hard disk drive 2040 stores programs and data used by the CPU 2000 in the computer 1900. The CD-ROM drive 2060 reads a program or data from a CD-ROM 2095 and provides it to the hard disk drive 2040 via the RAM 2020.

Connected to the I/O controller 2084 are the ROM 2010 and relatively slow I/O devices including the flexible disk drive 2050 and the I/O chip 2070. The ROM 2010 stores programs such as a boot program executed by the computer 1900 during boot-up and programs dependent on the hardware of the computer 1900. The flexible disk drive 2050 reads a program or data from a flexible disk 2090 and provides it to the hard disk drive 2040 via the RAM 2020. The I/O chip 2070 connects the flexible disk drive 2050 and also connects various I/O devices via ports such as a parallel port, serial port, keyboard port, and mouse port, for example.

Programs to be provided to the hard disk drive 2040 via the RAM 2020 are stored on a recording medium such as the flexible disk 2090, the CD-ROM 2095, or an IC card and provided by a user. The programs are read from the recording medium, installed on the hard disk drive 2040 in the computer 1900 via the RAM 2020, and executed in the CPU 2000.

A program installed on the computer 1900 and causing the computer 1900 to function as the detecting apparatus 20 includes an acquiring module, a measuring module, and a calculating module. The program causing the computer 1900 to function as the detecting apparatus 20 may be executed by an information processing apparatus (the computer 1900) different from the observed apparatus 10 or by the same information processing apparatus (the computer 1900) as one implementing the observed apparatus 10.

The program or modules control the CPU 2000 and other components to cause the computer 1900 to function as the acquiring unit 24, the measuring unit 26, and the calculating unit 28. More specifically, the program or modules cause this or another information processing apparatus to function as an acquiring unit 24 that acquires the second and first event count values by means of the input device 2025. The program or modules also cause this or the other information processing apparatus to function as the measuring unit 26 that measures the observed numbers by means of the CPU 2000 and stores them in storage such as the RAM 2020 or the hard disk drive 2040. In addition, the program or modules cause this or the other information processing apparatus to function as the calculating unit 28 that calculates the degree of correlation between the first events and the second events by means of the CPU 2000.

The above-described program or modules may be stored in an external storage medium. Besides the flexible disk 2090 and the CD-ROM 2095, the storage medium may be an optical recording medium such as a DVD or CD, a magnetooptical recording medium such as an MO, a tape medium, or a semiconductor memory such as an IC card. Alternatively, a storage device such as a hard disk or a RAM provided in a server system connected to a private communication network or the Internet may be used as the recording medium to provide the program to the computer 1900 over the network.

While the present invention has been described with respect to its embodiments, the technical scope of the present invention is not limited to that described in the embodiments. It will be apparent to those skilled in the art that various modifications or improvements can be made to the embodiments. It will be apparent from the claims that embodiments to which such modifications and improvements are made may also fall within the scope of the technical scope of the present invention.

The invention claimed is:

1. A detecting apparatus that detects a degree of correlation between first events and second events repeatedly occurring in an observed apparatus, comprising:
    an acquiring unit that acquires second event count values, each second event count value indicating a number of second events occurring during a first period, each first period being a period between a first event and a next first event;
    a measuring unit that measures an observed number of each second event count value derived from the number of times the second event count value is observed; and
    a calculating unit that calculates a strength/degree of correlation between the first events and the second events based on the observed number of each second event count value within a pre-established calculation formula in which the observed number of each second count value is evaluated: with one or more other values; within a measurement period; and/or against a pre-determined threshold;
    wherein the acquiring unit further acquires first event count values, each first event count value indicating a number of first events occurring during a second period, each second period being a period between a second event and a next second event;
    wherein the measuring unit further measures an observed number of each first event count value derived from the number of times the first event count value is observed; and
    wherein the calculating unit calculates the strengthldegree of correlation based on the observed number of each second event count value and each first event count value.

2. The detecting apparatus according to claim 1, wherein the calculating unit calculates the degree of correlation based on the number of the second event count values with an observed number not less than a predetermined threshold and the number of the first event count values with an observed number not less than a predetermined threshold.

3. The detecting apparatus according to claim 2, wherein the calculating unit calculates the degree of correlation by using a function that includes a product of the number of the second event count values with the observed number being nonzero and the number of the first event count values with the observed number being nonzero.

4. The detecting apparatus according to claim 3, wherein the measuring unit comprises:
    a flag storage unit that records, as the observed number, a first flag for each first event count value indicating whether or not the first event count value is observed and a second flag for each second event count value indicating whether or not the second event count value is observed;
    a flag updating unit that sets the first flag corresponding to an observed first event count value to a logical value 1 and sets the second flag corresponding to an observed second event count value to the logical value 1; and,
    wherein the calculating unit calculates the degree of correlation by using a function that includes the product of the number of the first flags set to the logical value 1 and the number of the second flags set to the logical value 1.

5. The detecting apparatus according to claim 1, wherein the calculating unit calculates the degree of correlation based on a number of nonzero second event count values with the observed number not less than a predetermined threshold and a number of nonzero first event count values with the observed number not less than a predetermined threshold.

6. The detecting apparatus according to claim 1, further comprising:
    a collecting unit that collects an internal state of at least part of the observed apparatus at predetermined intervals into an internal state storage unit; and
    an update inhibiting unit that inhibits updating of the internal state stored in the internal state storage unit and saves the internal state in at least one of the case where the degree of correlation is above a predetermined upper limit and the case where the degree of correlation is below a predetermined lower limit.

7. A method for detecting a degree of correlation between first events and second events repeatedly occurring in an observed apparatus, the method comprising:
    acquiring, via an acquiring unit, second event count values, each second event count value indicating a number of second events occurring during a first period, each first period being a period between a first event and a next first event;
    acquiring first event count values, each first event count value indicating a number of first events occurring during a second period, each second period being a period between a second event and a next second event;
    measuring, via a measuring unit, an observed number of each second event count value derived from the number of times the second event count value is observed; and
    measuring an observed number of each first event count value derived from the number of times the first event count value is observed;
    calculating, via a calculating unit, a strength/degree of correlation between the first events and the second events based on the observed number of each second event count value within a pre-established calculation formula in which the observed number of each second count value is evaluated: with one or more other values; within a measurement period; and/or against a pre-determined threshold; and
    calculating the strength/degree of correlation based on the observed number of each second event count value and each first event count value.

8. The method according to claim 7, wherein the calculating of the degree of correlation based on the number of the second event count values includes an observed number not less than a predetermined threshold and the number of the first event count values with an observed number not less than a predetermined threshold.

9. The method according to claim 8, wherein the calculating includes using a function that includes a product of the number of the second event count values with the observed number being nonzero and the number of the first event count values with the observed number being nonzero.

10. The method according to claim 9, wherein said measuring comprises:
recording a first flag for each first event count value indicating whether or not the first event count value is observed;
recording a second flag for each second event count value indicating whether or not the second event count value is observed;
setting the first flag corresponding to an observed first event count value to a logical value 1;
setting the second flag corresponding to an observed second event count value to the logical value 1; and
said calculating includes using a function that includes the product of the number of the first flags set to the logical value 1 and the number of the second flags set to the logical value 1.

11. The method according to claim 7, wherein the calculating step calculates the degree of correlation based on a number of nonzero second event count values with the observed number not less than a predetermined threshold and a number of nonzero first event count values with the observed number not less than a predetermined threshold.

12. The method according to claim 7, further comprising:
collecting an internal state of at least part of the observed apparatus at predetermined intervals into an internal state storage unit; and
inhibiting updating of the internal state stored in the internal state storage unit and saves the internal state in at least one of the case where the degree of correlation is above a predetermined upper limit and the case where the degree of correlation is below a predetermined lower limit.

13. A non-transitory computer-readable storage medium encoded with a computer program having instructions which execute on an instruction processing apparatus to provide functions comprising:
acquiring second event count values, each second event count value indicating a number of second events occurring during a first period, each first period being a period between a first event and a next first event;
acquiring first event count values, each first event count value indicating a number of first events occurring during a second period, each second period being a period between a second event and a next second event;
measuring an observed number of each second event count value derived from the number of times the second event count value is observed; and
measuring an observed number of each first event count value derived from the number of times the first event count value is observed;
calculating a strength/degree of correlation between the first events and the second events based on the observed number of each second event count value within a pre-established calculation formula in which the observed number of each second count value is evaluated: with one or more other values; within a measurement period; and/or against a pre-determined threshold; and
calculating the strength/degree of correlation based on the observed number of each second event count value and each first event count value.

14. The non-transitory computer-readable storage medium as claimed in claim 13, wherein the instructions calculating of the degree of correlation based on the number of the second event count values include instructions using an observed number not less than a predetermined threshold and the number of the first event count values with an observed number not less than a predetermined threshold.

15. The non-transitory computer-readable storage medium as claimed in claim 14, wherein the calculating instructions include instructions using a function that includes a product of the number of the second event count values with the observed number being nonzero and the number of the first event count values with the observed number being nonzero.

16. The non-transitory computer-readable storage medium as claimed in claim 15, wherein said measuring instructions comprise:
instructions recording a first flag for each first event count value indicating whether or not the first event count value is observed;
instructions recording a second flag for each second event count value indicating whether or not the second event count value is observed;
instructions setting the first flag corresponding to an observed first event count value to a logical value 1;
instructions setting the second flag corresponding to an observed second event count value to the logical value 1; and
said calculating instructions include instructions using a function that includes the product of the number of the first flags set to the logical value 1 and the number of the second flags set to the logical value 1.

17. The non-transitory computer-readable storage medium as claimed in claim 13, wherein the calculating instructions calculate the degree of correlation based on a number of nonzero second event count values with the observed number not less than a predetermined threshold and a number of nonzero first event count values with the observed number not less than a predetermined threshold.

* * * * *